United States Patent
Tokumura et al.

(10) Patent No.: US 9,489,922 B2
(45) Date of Patent: Nov. 8, 2016

(54) ELECTRO-OPTICAL DEVICE AND ELECTRONIC APPARATUS

(71) Applicant: Seiko Epson Corporation, Tokyo (JP)

(72) Inventors: Toshiaki Tokumura, Suwa (JP); Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/324,662

(22) Filed: Jul. 7, 2014

(65) Prior Publication Data

US 2014/0320480 A1    Oct. 30, 2014

Related U.S. Application Data

(63) Continuation of application No. 13/614,595, filed on Sep. 13, 2012, now Pat. No. 8,810,494.

(30) Foreign Application Priority Data

Sep. 28, 2011  (JP) ................. 2011-212182

(51) Int. Cl.
*G09G 5/18*   (2006.01)
*H04N 13/04*  (2006.01)
*G09G 3/36*   (2006.01)

(52) U.S. Cl.
CPC  *G09G 5/18* (2013.01); *G09G 3/36* (2013.01); *H04N 13/0438* (2013.01); *H04N 13/0497* (2013.01); *H04N 2213/008* (2013.01)

(58) Field of Classification Search
CPC ................... G09G 3/3648; G09G 2320/0271; G09G 3/2018; G09G 3/204; H04N 13/0438
USPC ........................... 345/94, 690, 204
See application file for complete search history.

(56) References Cited

U.S. PATENT DOCUMENTS

| | | | |
|---|---|---|---|
| 8,810,494 B2* | 8/2014 | Tokumura et al. | 345/94 |
| 2003/0179221 A1* | 9/2003 | Nitta | G09G 3/3406 345/690 |
| 2005/0219187 A1* | 10/2005 | Shih | 345/94 |

(Continued)

FOREIGN PATENT DOCUMENTS

| | | |
|---|---|---|
| JP | 2005-37749 A | 2/2005 |
| JP | 2006-163358 A | 6/2006 |

(Continued)

OTHER PUBLICATIONS

Notice of Allowance and Notice of Allowability received in U.S. Appl. No. 13/614,595 ; Apr. 16, 2014.

*Primary Examiner* — Kevin M Nguyen
(74) *Attorney, Agent, or Firm* — ALG Intellectual Property, LLC (57) ABSTRACT

In at least one embodiment, an electro-optical device displays a right-eye image and a left-eye image for each display period. The driving circuit supplies a gradation potential to each of the pixels according to a specific gradation using image data which corresponds to the unit period in each of a plurality of unit periods in each of the display periods, and sequentially selects one or more scanning lines in a plurality of lines and supplies a gradation potential to each of the signal lines according to a specific gradation of each of the pixels which corresponds to the one or more scanning lines in a selected state in a unit period in each of the display periods. A driving control section executes overdrive of each of the pixels in the driving circuit in a first unit period in each of the display periods.

15 Claims, 8 Drawing Sheets

(56) References Cited

U.S. PATENT DOCUMENTS

| | | |
|---|---|---|
| 2006/0125942 A1 | 6/2006 | Hosaka et al. |
| 2007/0120799 A1 | 5/2007 | Tanaka et al. |
| 2008/0122769 A1 | 5/2008 | Takaki |
| 2008/0224980 A1* | 9/2008 | Senda ............... G09G 3/3648 345/96 |
| 2009/0140965 A1 | 6/2009 | Ishiguchi et al. |
| 2010/0053429 A1* | 3/2010 | Miyazaki ............... H04N 7/014 348/513 |
| 2010/0309381 A1* | 12/2010 | Nakagawa ......... H04N 13/0438 348/705 |
| 2011/0018859 A1 | 1/2011 | Ito |
| 2011/0063332 A1* | 3/2011 | Liao et al. .................. 345/690 |
| 2011/0090321 A1* | 4/2011 | Nakagawa ............. G09G 3/003 348/51 |
| 2011/0169871 A1 | 7/2011 | Suzuki et al. |
| 2012/0098822 A1* | 4/2012 | Kim ..................... G09G 3/003 345/419 |
| 2012/0188348 A1* | 7/2012 | Umeda et al. .................. 348/54 |
| 2012/0287098 A1 | 11/2012 | Ito |
| 2013/0057791 A1* | 3/2013 | Kitayama ............. G09G 3/003 349/15 |
| 2014/0333607 A1 | 11/2014 | Ito |

FOREIGN PATENT DOCUMENTS

| | | |
|---|---|---|
| JP | 2006-267360 A | 10/2006 |
| JP | 2008-275968 A | 11/2008 |
| JP | 2009-25436 A | 2/2009 |
| JP | 2009-133956 A | 6/2009 |
| JP | 2010-261985 A | 11/2010 |
| JP | 2010-282089 A | 12/2010 |
| JP | 2011-027810 A | 2/2011 |
| JP | 2011-76034 A | 4/2011 |
| JP | 2011-112745 A | 6/2011 |

* cited by examiner

ELECTRO-OPTICAL DEVICE AND ELECTRONIC APPARATUS

CROSS-REFERENCE

The present application is a continuation application of U.S. patent application Ser. No. 13/614,595 filed on Sep. 13, 2012, which claims priority from Japanese Patent Application No. 2011-212182 filed on Sep. 28, 2011, which are hereby incorporated by reference in their entirety.

BACKGROUND

1. Technical Field

The present invention relates to a technique where a right-eye image and a left-eye image are displayed so that parallax is imparted alternately such that an observer perceives a stereoscopic effect.

2. Related Art

Figure 10:
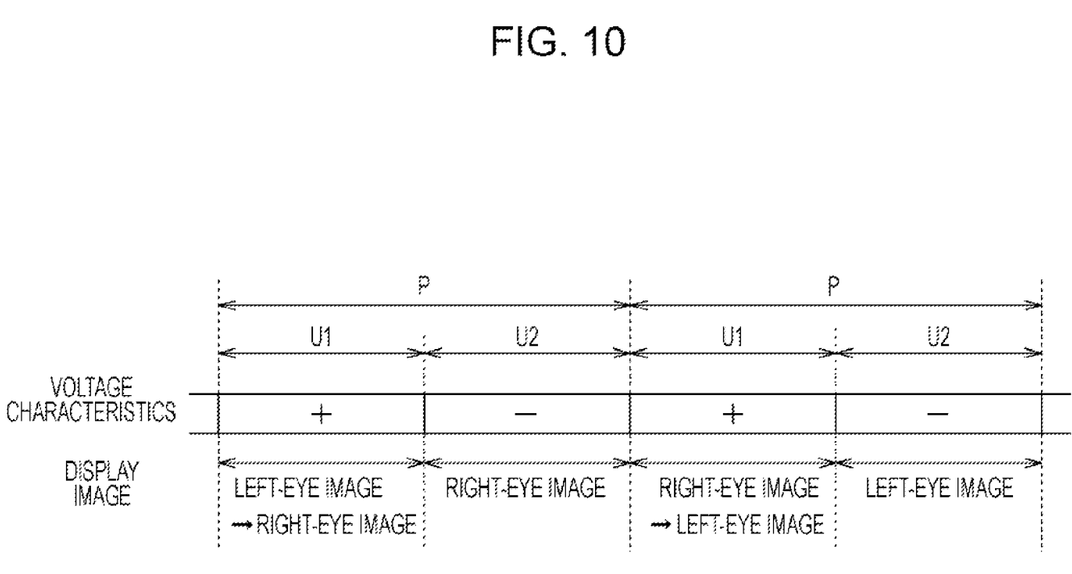
FIG. 10 is an explanatory diagram of a stereoscopic action in a comparative example.

A stereoscopic method of a frame sequential scheme where a right-eye image and a left-eye image are alternately displayed in a time divisional manner has been proposed from the past. For example, the technique disclosed in JP-A-2009-25436 uses a plurality of pixels which include liquid crystal elements, and as shown in FIG. 10, the right-eye image and left-eye image are alternately displayed in each display period P. Each of the display periods P is segmented into a unit period U1 and a unit period U2.

A display image is updated to the right-eye image from the left-eye image in the unit period U1 in the display period P of the right-eye image and the right-eye image is displayed in the immediately following unit period U2, and a display image is updated to the left-eye image from the right-eye image in the unit period U1 in the display period P of the left-eye image and the left-eye image is displayed in the immediately following unit period U2. In the unit period U1 and the unit period U2 of each of the display periods P, an applied voltage is set to reverse polarity with regard to the liquid crystal element. In the unit period U1 of each of the display periods P, both a right-eye shutter and a left-eye shutter are controlled to be in a closed state. Accordingly, mixture of the right-eye image and the left-eye image (referred to below as "crosstalk") is not perceived by the observer.

However, on the basis of the technique in JP-A-2009-25436, since each of the pixels is sequentially selected on each line and is driven at a specified gradient in each of the unit period U1 and the unit period U2, the length of time of the unit period U1, where both the right-eye shutter and the left-eye shutter are maintained in the closed state, is long. Accordingly, there is a problem in that it is difficult to sufficiently secure the brightness of a display image.

SUMMARY

An advantage of some aspects of the invention is that the brightness of the display image is improved while mixture of the right-eye image and the left-eye image being perceived by the user is suppressed.

According to an aspect of the invention, there is provided an electro-optical device, which displays a right-eye image and a left-eye image for each of the display periods and which is provided with a plurality of pixels which are arranged to correspond to intersections of a plurality of scanning lines and a plurality of signal lines, a driving circuit which is a circuit which supplies a gradation potential to each of the pixels according to a specific gradation using image data which corresponds to the unit period in each of a plurality of unit periods in each of the display periods and which sequentially selects the scanning lines in a plurality of lines at a time and supplies a gradation potential to each of the signal lines according to a specific gradation of each of the pixels which corresponds to any of the scanning lines out of the plurality of lines in a selected state in a first unit period in each of the display periods, and driving control unit which executes overdrive of each of the pixels in the driving circuit in each of two or more unit periods which include the first unit period in each of the display periods. In the configuration above, since the gradation potential is supplied to each of the pixels of a selected line by the scanning lines being sequentially selected a plurality of lines at a time in the first unit period in each of the display periods, for example, when compared to a configuration by the gradation potential being supplied to each of the pixels using the selection of one scanning line at a time in the first unit period in each of the display periods, a length of time of a period, where the right-eye image and the left-eye image are in a mixed state, is reduced. Accordingly, it is possible for the brightness of a display image which is visually recognized by an observer to be improved. Furthermore, since overdrive of each of the pixels is executed in the plurality of unit periods in the display period, there is an advantage in that it is possible for each of the pixels to be sufficiently driven regardless of a configuration where the first unit period is short (accordingly, crosstalk is suppressed).

It is preferable that, in a first unit period in each of the display periods, the driving control unit execute overdrive with a correction amount in the driving circuit according to a difference between image data of the unit period and image data of a last unit period in the immediately previous display period. Here, an appropriate overdrive aspect in a second unit period and beyond in each of the display periods is arbitrary. For example, it is possible to adopt a configuration where overdrive with a correction amount is executed in the driving circuit according to a difference between image data of the unit period and image data of a last unit period within a immediately previous display period (for example, a second action mode which will be described later) or a configuration where overdrive with a correction amount is executed in the driving circuit according to a difference between image data of the unit period and image data of the first unit period in the display period (for example, a third action mode which will be described later) in a second unit period in each of the display periods. In addition, it is possible to execute overdrive with a correction amount in a driving circuit according to a difference between image data of the unit period and image data of the immediately previous unit period respectively in a plurality of unit periods (for example, all of the unit periods) in each of the display periods (for example, a fourth action mode which will be described later).

It is preferable that, the driving control unit set either an action mode in which, in a second unit period in each of the display periods, overdrive with a correction amount is executed in the driving circuit according to a difference between image data of the unit period and image data of the last unit period in the immediately previous display period, or an action mode in which, in a second unit period in each of the display periods, overdrive with a correction amount is executed in the driving circuit according to a difference between image data of the unit period and image data of the first unit period in the display period. The above aspect has an advantage in that it is possible to select an appropriate action mode according to, for example, display image content or pixel response characteristics since the driving control unit is operated in any of a plurality of action modes where an overdrive aspect is different.

It is preferable that, the driving circuit sequentially select Q lines (Q is a natural number of two or more) of the scanning lines of and supplies a gradation potential to each of the signal lines according to a specific gradation of each of the pixels which corresponds to the first scanning line out of Q lines in a selected state in a first unit period in each of the display periods, and sequentially selects a second scanning line other than the first scanning line out of the Q lines and supplies a gradation potential to each of the signal lines according to a specific gradation of each of the pixels which corresponds to the second scanning line in a selected state in the second unit period in each of the display periods. In the above aspect, an image is displayed where the resolution is reduced in an arrangement direction of the plurality of scanning lines in the first unit period, but it is possible to increase the display image resolution in the second unit period.

The electro-optical device according to each of the above aspects is adopted in various electronic apparatuses as a display body. For example, a stereoscopic display device, which is provided with the electro-optical device according to each of the above aspects and stereoscopic glasses which are controlled by a glasses control circuit, is exemplified as the electronic apparatus of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
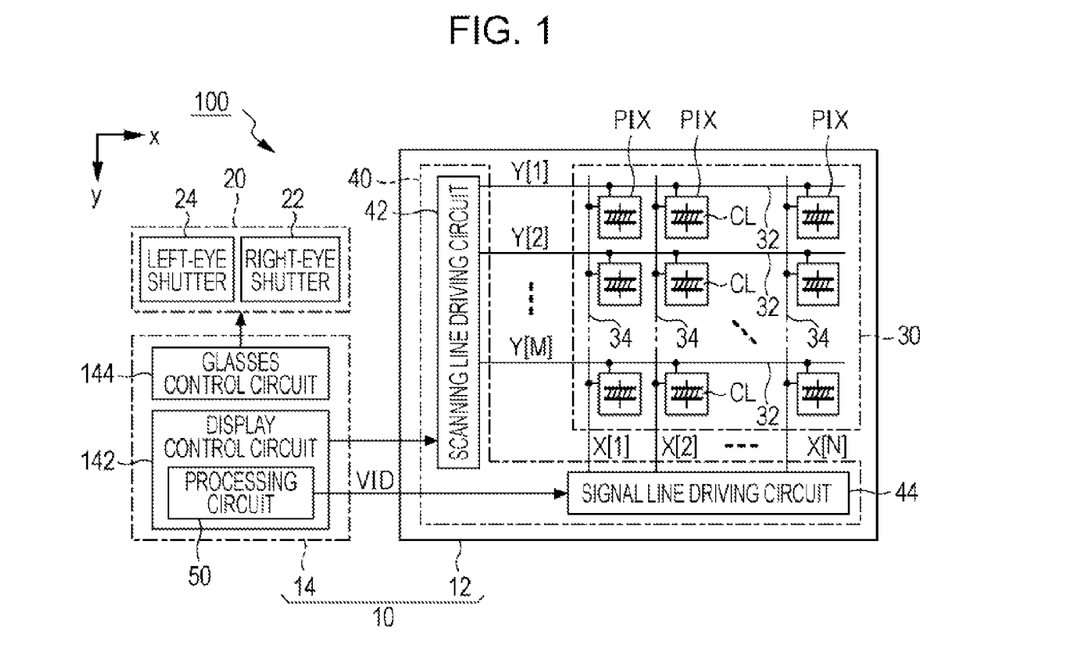
FIG. 1 is a block diagram of a stereoscopic display device according to a first embodiment of the invention.

FIG. 1 is a block view of a stereoscopic display device 100 according to one embodiment of the invention. The stereoscopic display device 100 is an electronic apparatus which displays stereoscopic images using an active shutter method where a viewer is able to perceive a stereoscopic effect and is provided with an electro-optical device 10 and stereoscopic glasses 20. The electro-optical device 10 alternatively displays a right-eye image GR and a left-eye image GL where parallax is imparted alternately in a time divisional manner. Here, a case is described below where the right-eye image GR and the left-eye image GL are comprehensively represented as an image Gi (i=R, L).

The stereoscopic glasses 20 are a glasses type of device which an observer wears to visually recognize a stereoscopic image which is displayed by the electro-optical device 10, and are provided with a right-eye shutter 22 which is positioned in a forward direction of the right-eye of the observer and a left-eye shutter 24 which is positioned in a forward direction of the left-eye of the observer. The right-eye shutter 22 and the left-eye shutter 24 are respectively controlled in an open state where irradiated light is transmitted therethrough (transmitting state) and a closed state where irradiated light is blocked (light blocking state). For example, due to changes in orientation direction of a liquid crystal according to an applied voltage, a liquid crystal shutter which changes from either one of the open state and the closed state to the other one may be adopted as the right-eye shutter 22 and the left-eye shutter 24.

The electro-optical device 10 in FIG. 1 is provided with an electro-optical panel 12 and a control circuit 14. The electro-optical panel 12 includes a pixel section 30 where a plurality of pixels (a pixel circuit) PIX are arranged and a driving circuit 40 which drives each of the pixels PIX. In the pixel section 30, M lines of scanning lines 32 which extend in an X direction and N lines of signal lines 34 which extend in a Y direction which intersects the X direction are formed (M and N are natural numbers). The plurality of pixels PIX in the pixel section 30 are arranged in a matrix of M rows vertically by N columns horizontally corresponding to each intersection of the scanning lines 32 and the signal lines 34.

Figure 2:
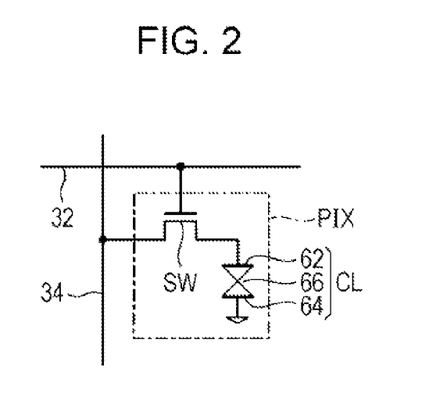
FIG. 2 is a circuit diagram of a pixel circuit.

FIG. 2 is a circuit view of each of the pixels PIX. As shown in FIG. 2, each of the pixels PIX includes a liquid crystal element CL and a selection switch SW. The liquid crystal element CL is an electro-optical element which is configured by a pixel electrode 62 and a common electrode 64 which oppose each other and liquid crystals 66 between both of the electrodes. The transmissivity (display gradation) of the liquid crystals 66 varies according to a voltage applied between the pixel electrodes 62 and the common electrodes 64. The selection switch SW is configured of an N channel type thin film transistor where a gate is connected to the scanning lines 32 and controls the electrical connection (conduction/insulation) between the liquid crystal CL and the signal lines 34 by being interposed between the two. Here, a configuration may be adopted in the liquid crystal element CL where an auxiliary capacity is connected in parallel.

The control circuit 14 in FIG. 1 is provided with a display control circuit 142 which controls the electro-optical panel 12 and a glasses control circuit 144 which controls the stereoscopic glasses 20. The display control circuit 142 controls the driving circuit 40 such that the right-eye image GR and the left-eye image GL are alternately displayed in a time divisional manner in the pixel section 30. For example, the display control circuit 142 generates an image signal VID where the gradation of each of the pixels PIX in the image section 30 is specified and supplies the image signal VID to the driving circuit 40. Here, in addition to a configuration where the display control circuit 142 and the glasses control circuit 144 are mounted in a single integrated circuit, a configuration may be adopted where the display control circuit 142 and the glasses control circuit 144 are dispersed in separate integrated circuits.

The driving circuit 40 in FIG. 1 is a circuit which applies a voltage to the liquid crystal element CL of each of the pixels PIX according to a gradation (referred to below as "specific gradation") where the image signal VID which is supplied from the display control circuit 142 is specified with regard to each of the pixels PIX, and is provided with a scanning line driving circuit 42 and a signal line driving circuit 44. The scanning line driving circuit 42 sequentially selects each of the scanning lines 32 by the supplying of scanning signals Y[1] to Y[M] which correspond to each of the scanning lines 32. By setting a scanning signal Y[m] (m=1 to M) to a predetermined selection potential (that is, the scanning line 32 of the $m^{th}$ row is selected), the selection switches SW in each of the pixels PIX of the $m^{th}$ row are transitioned to an on state at the same time. The signal line driving circuit 44 respectively supplies the gradation potentials X[1] to X[N] to the N lines of signal lines 34 by selectively synchronizing the scanning lines 32 using the scanning line driving circuit 42. Each of the pixels PIX (the liquid crystal element CL) displays gradation according to the gradation potential X[n] of the signal lines 34 during the selection of the scanning lines 32 (when the selection switch SW is controlled so as to be in the on state).

Figure 3:
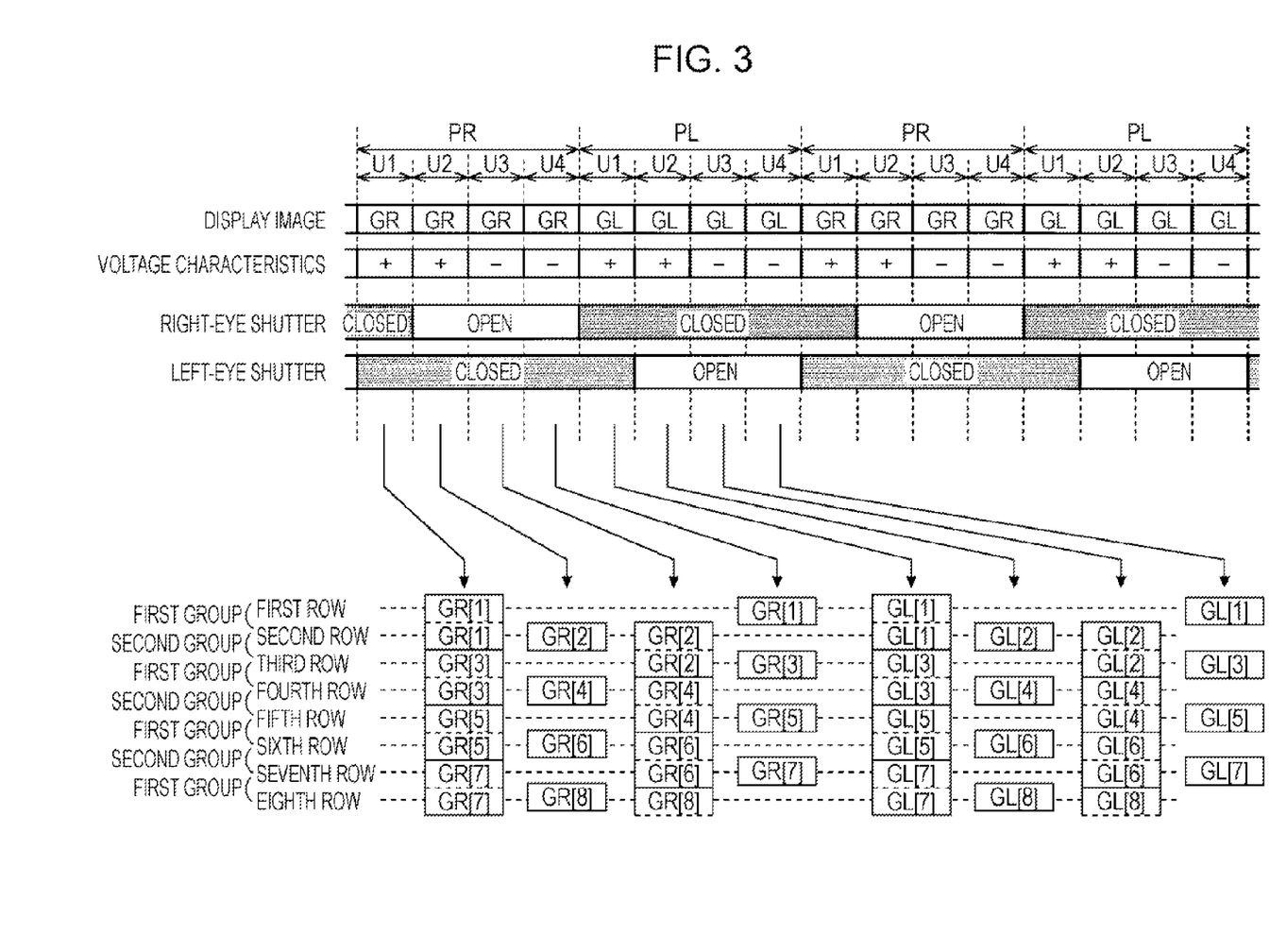
FIG. 3 is an explanatory diagram of an action of the first embodiment.

FIG. 3 is an explanatory diagram of an action of the electro-optical device 10. As shown in FIG. 3, an action period of the electro-optical device 10 is segmented into a plurality of display periods Pi (a right-eye display period PR and a left-eye display period PL). The right-eye image GR is displayed in the pixel section 30 in the right-eye display period PR and the left-eye image GL is displayed in the pixel section 30 in the left-eye display period PL. The right-eye display period PR and the left-eye display period PL are alternatively arranged on a time axis. Each of the display periods Pi (PR, PL) is segmented into four unit periods U (U1 to U4) which are an equal length of time. The unit period U2 follows the unit period U1, the unit period U3 follows the unit period U2, and the unit period U4 follows the unit period U3. For example, the length of time of each of the display periods Pi is set to approximately 1/120 of a second, and the length of time of each of the unit periods U is set to 1/480 of a second.

The driving circuit 40 periodically inverts the polarity of the applied voltage with regard to the liquid crystal element CL of each of the pixels PIX. A configuration where the polarity of the applied voltage (for example, the polarity of a gradation potential X[n] with regard to a predetermined potential) with regard to the liquid crystal element CL is inverted for each two unit periods U is exemplified in FIG. 3. That is, the polarity of the applied voltage of the liquid crystal element CL is set to a positive polarity (for example, a state where the potential of the pixel electrode 62 is higher than the potential of the common electrode 64) in the unit period U1 and the unit period U2 in each of the display periods Pi and is set to a negative polarity (for example, a state where the potential of the pixel electrode 62 is lower than the potential of the common electrode 64) in the unit period U3 and the unit period U4 in each of the display periods Pi.

Figure 4:
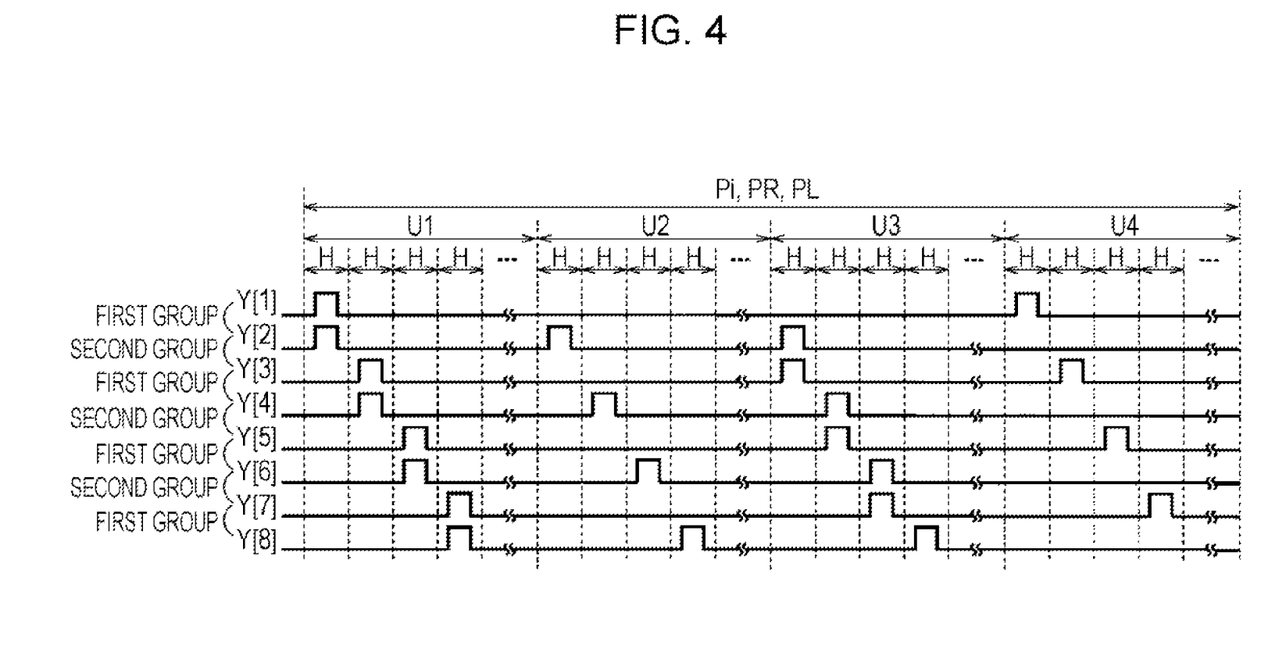
FIG. 4 is an explanatory diagram of an action of a scanning line driving circuit.

FIG. 4 is an explanatory diagram of an action of the scanning line driving circuit 42 in each of the display periods Pi (PR, PL). The action of the driving circuit 40 in the respective unit periods U1 to U4 in each of the display periods Pi (PR, PL) will be described below with reference to FIGS. 3 and 4.

1. Unit Period U1

As shown in FIG. 4, the scanning line driving circuit 42 sequentially selects each of a plurality of groups (referred to below as a "first group"), which have been segmented for every two rows which are adjacent to each other in the M lines of the scanning lines 32, for each of the selection periods H in the unit period U1 in each of the display periods Pi. The first group is configured by one of the scanning lines 32 ($2k^{th}$ row) in an even row and one of the scanning lines 32 (($2k-1)^{th}$ row) in an odd row which is adjacent to a negative side in a y direction with regard to the scanning line 32. The scanning line driving circuit 42 simultaneously selects the two scanning lines 32 of the first group by setting a scanning signal Y[2k-1] and a scanning signal Y[2k] to the selection potential in one selection period H in the unit period U1. For example, the two scanning line 32 of the first row and the second row are simultaneously selected in the first selection period H in the unit period U1 and the two scanning line 32 of the third row and the fourth row are simultaneously selected in the second selection period H in the unit period U1.

As shown in FIG. 3, in the selection period H where the two scanning lines 32 of the $(2k-1)^{th}$ row and the $2k^{th}$ row, which configure a first group out of the unit period U1 in each of the display periods Pi (PR, PL), are selected, the signal line driving circuit 44 supplies a gradation potential X[n] to each of the signal lines 34 according to a specific gradation Gi[2k-1] of each of the pixels PIX of a (2k-1)th row out of an image Gi. For example, in the first selection period H out of the unit period U1 in the right-eye display period PR, the gradation potential X[n] is supplied to each of the signal lines 34 according to a specific gradation GR[1] of each of the pixels PIX of the first row out of the right-eye image GR, and in the second selection period H, the gradation potential X[n] is supplied to each of the signal lines 34 according to a specific gradation GR[3] of each of the pixels PIX of the third row out of the right-eye image GR.

Accordingly, in the $k^{th}$ selection period H in each of the display periods Pi, the gradation potential X[n] is commonly supplied to each of the pixels PIX of the $(2k-1)^{th}$ row and the $2k^{th}$ row according to the specific gradation Gi[2k-1] of the $(2k-1)^{th}$ row out of the image Gi. That is, at a point in time of the completion of the unit period U1, the image Gi, where the resolution in the y direction is reduced by half, is displayed in the pixel section 30.

2. Unit Period U2

As shown in FIG. 4, the scanning line driving circuit 42 sequentially selects each of the scanning lines 32 in the even rows for each of the selection periods H in the unit period U2 in each of the display periods Pi. That is, M lines of the scanning lines 32 are selected for every second line. Specifically, the scanning line driving circuit 42 selects one line of the scanning lines 32 in the $2k^{th}$ row by setting the scanning signal Y[2k] to the selection potential in the $k^{th}$ selection period H in the unit period U2. For example, the scanning line 32 of the second row is selected in the first selection period H in the unit period U2 and the scanning line 32 of the fourth row is selected in the second selection period H. The scanning lines 32 of the odd rows are not selected in the unit period U2.

As shown in FIG. 3, in the selection period H where one line of the scanning lines 32 in the $2k^{th}$ row out of the unit period U2 in each of the display periods Pi (PR, PL) is selected, the signal line driving circuit 44 supplies the gradation potential X[n] to each of the signal lines 34 according to the specific gradation Gi[2k] of each of the pixels PIX in the $2k^{th}$ row out of the image Gi. For example, the gradation potential X[n] is supplied to each of the signal lines 34 according to the specific gradation GR[2] of each of the pixels PIX in the second row out of the right-eye image GR in the first selection period H out of the unit period U2 in the right-eye display period PR, and the gradation potential X[n] is supplied to each of the signal lines 34 according to the specific gradation GR[4] of each of the pixels PIX in the fourth row out of the right-eye image GR in the second selection period H.

Accordingly, the gradation potential X[n] is supplied to each of the pixels PIX of the $2k^{th}$ row according to the specific gradation Gi[2k] of the $2k^{th}$ row out of the image Gi in the $k^{th}$ selection period H in each of the display periods Pi. On the other hand, the applied voltage of the liquid crystal element CL in each of the pixels PIX in odd rows is maintained at a set voltage in the immediately previous unit period U1. As a result of the above action, the image Gi, which is displayed with half resolution in the y direction at the completion of the unit period U1, is updated to the image Gi with expected resolution (M rows vertically by N columns horizontally) at the completion of the unit period U2.

3. Unit Period U3

As shown in FIG. 4, the scanning line driving circuit 42 sequentially selects each of a plurality of groups (referred to below as a "second group"), which have been segmented for every two rows which are adjacent to each other in the M lines of the scanning lines 32 in a combination which is different to the first group, for each of the selection periods H in the unit period U3 in each of the display periods Pi (PR, PL). The first group is configured by one of the scanning lines 32 ($2k^{th}$ row) in an even row and one of the scanning lines 32 ($(2k+1)^{th}$ row) in an odd row which is adjacent to a positive side in a y direction with regard to the scanning line 32. That is, the first group and the second group are in a relationship which is shifted by only one line of the scanning line 32 in the y direction. The scanning line driving circuit 42 simultaneously selects the two scanning lines 32 of the second group by setting a scanning signal Y[2k] and a scanning signal Y[2k+1] to the selection potential in one selection period H in the unit period U3. For example, the two scanning lines 32 of the second row and third row are simultaneously selected in the first selection period H in the unit period U3, and the two scanning lines 32 of the fourth row and the fifth row are simultaneously selected in the second selection period H in the unit period U3.

As shown in FIG. 3, in the selection period H where the two scanning lines 32 of the $2k^{th}$ row and the $(2k+1)^{th}$ row, which configure a second group out of the unit period U3 in each of the display periods Pi (PR, PL), are selected, the signal line driving circuit 44 supplies a gradation potential X[n] to each of the signal lines 34 according to a specific gradation Gi[2k] of each of the pixels PIX of a $2k^{th}$ row out of the image Gi. Accordingly, in the $k^{th}$ selection period H in each of the display periods Pi, the gradation potential X[n] is commonly supplied to each of the pixels PIX of the $2k^{th}$ row and the $(2k+1)^{th}$ row according to the specific gradation Gi[2k] of the $2k^{th}$ row out of the image Gi. That is, at a point in time of the completion of the unit period U3, the image Gi, where the resolution in the y direction is reduced by half, is displayed in the pixel section 30. Here, in FIG. 3, a case where the gradation potential X[n] of the first row of each of the pixels PIX is not supplied in the unit period U3 is exemplified for convenience, but it is possible to supply the gradation potential X[n] according to the specific gradation Gi[1] of the corresponding row of the first row of each of the pixels PIX or the gradation potential X[n] according to a predetermined gradation (for example, a black gradation or an intermediate gradation).

4. Unit Period U4

As shown in FIG. 4, the scanning line driving circuit 42 sequentially selects each of the scanning lines 32 in the odd rows for each of the selection periods H by setting a scanning signal Y[2k−1] to the selection potential in the unit period U4 in each of the display periods Pi. For example, the scanning line 32 of the first row is selected in the first selection period H in the unit period U4 and the scanning line 32 of the third row is selected in the second selection period H. The scanning lines 32 of the even rows are not selected in the unit period U4.

As shown in FIG. 3, in the selection period H where one line of the scanning lines 32 in the $(2k−1)^{th}$ row out of the unit period U4 in each of the display periods Pi (PR, PL) is selected, the signal line driving circuit 44 supplies the gradation potential X[n] to each of the signal lines 34 according to the specific gradation Gi[2k−1] of each of the pixels PIX in the $(2k−1)^{th}$ row out of the image Gi. Accordingly, the gradation potential X[n] is supplied to each of the pixels PIX of the $(2k−1)^{th}$ row according to the specific gradation Gi[2k−1] in each of the pixels PIX of the $(2k−1)^{th}$ row of the image Gi in the $k^{th}$ selection period H in the unit period U4. As a result of the above action, the image Gi, which is displayed with half resolution in the y direction at the completion of the unit period U3, is updated to the image Gi with expected resolution (M rows vertically by N columns horizontally) at the completion of the unit period U4. The above is the action of the driving circuit 40 in each of the unit periods U.

Figure 5:
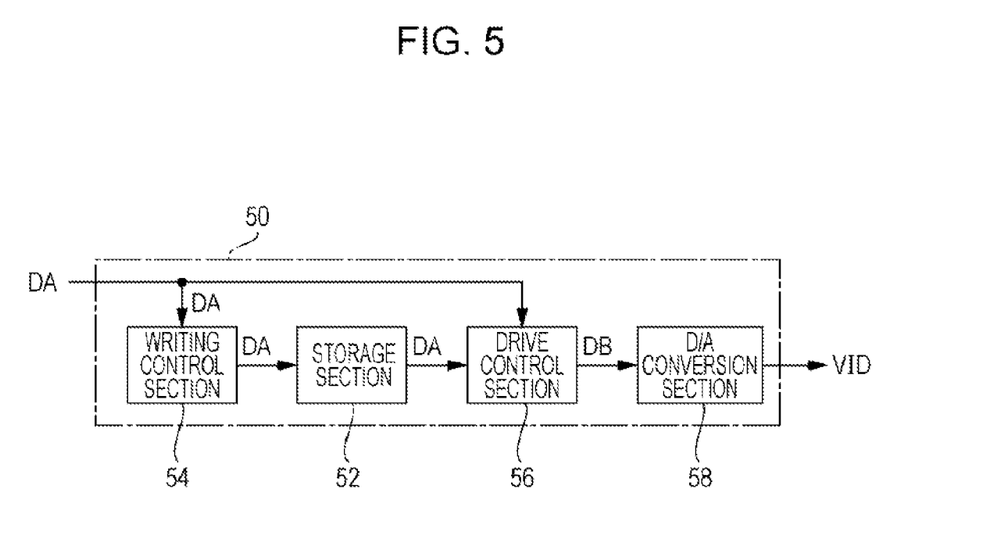
FIG. 5 is a block diagram of a processing circuit.

As shown in FIG. 1, the display control circuit 142 of the control circuit 14 in the embodiment is provided with a processing circuit 50 where the overdrive (excess voltage driving), which compensates for the delay in the response of the liquid crystals 66 by the application of an excess voltage which exceeds the target voltage according to the specific gradation to the liquid crystal element CL of each of the pixels PIX, is executed in the driving circuit 40. FIG. 5 is a block diagram of the processing circuit 50. As shown in FIG. 5, image data DA where the gradation of the right-eye image GR or the left-eye image GL is specified for each of the pixels PIX is sequentially supplied to the processing circuit 50 from an external circuit (not shown) for each of the unit periods U of each of the display periods P. Here, it is possible for the image data DA after processing using another circuit in the display control circuit 142 to be supplied to the processing circuit 50.

As is understood from the action of the driving circuit 40 described above, the gradation potential X[n] is supplied to each of the pixels PIX according to any one of the specific gradations of the odd rows or the even rows of the image Gi in each of the unit periods U of the display period Pi. Accordingly, the image data DA which specifies the specific gradation of each of the pixels PIX for (M/2) rows vertically by N columns horizontally is supplied to the processing circuit 50 in each of the unit periods U.

Specifically, the image data DA which specifies the gradation Gi[2k−1] of the odd rows of the image Gi (Gi[1], Gi[3], Gi[5], . . . ) is supplied to the processing circuit 50 in the unit period U1 of each of the display periods Pi, and the image data DA which specifies the gradation Gi[2k] of the even rows of the image Gi (Gi[2], Gi[4], Gi[6], . . . ) is supplied to the processing circuit 50 in the unit period U2 of each of the display periods Pi. In addition, the image data DA which specifies the gradation Gi[2k] of the even rows of the image Gi is supplied to the processing circuit 50 in the unit period U3 of each of the display periods Pi, and the image data DA which specifies the gradation Gi[2k−1] of the odd rows of the image Gi is supplied to the processing circuit 50 in the unit period U4 of each of the display periods Pi.

The processing circuit 50 of the embodiment is able to be activated in a plurality of action modes (a first action mode to a fourth action mode) where the aspects of the overdrive which is executed by the driving circuit 40 are different. The action mode of the processing circuit 50 is selected according to an action mode signal which is supplied from an external circuit (for example, a CPU). FIGS. 6A to 6D are explanatory diagrams of each of the action modes.

Figures 6A, 6B:
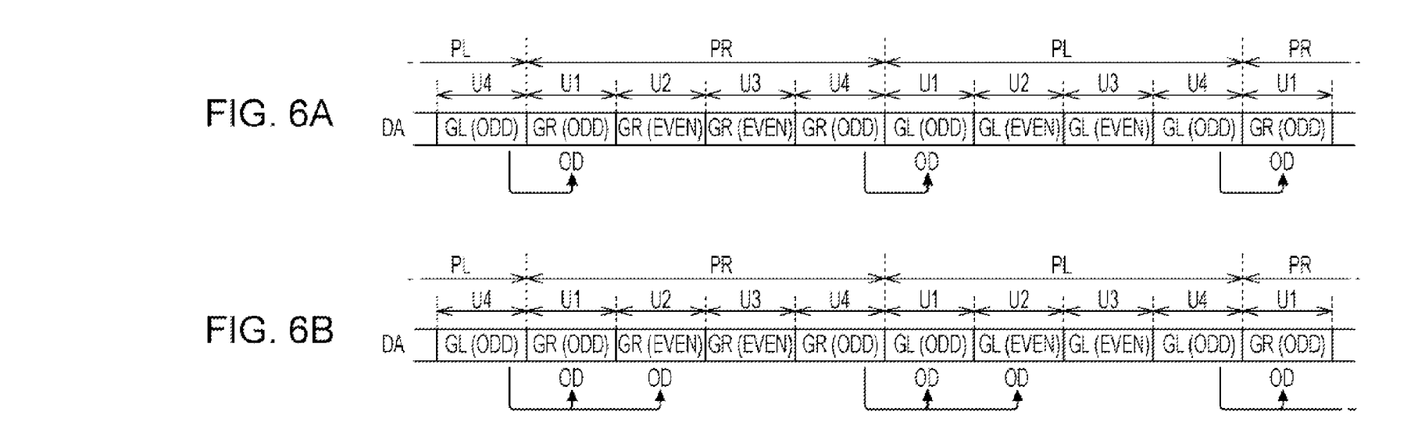
FIGS. 6A to 6D are explanatory diagrams of action modes.

The first action mode is an action mode where the overdrive (OD) is executed in the driving circuit 40 in only the unit period U1 in each of the display period Pi as shown in FIG. 6A. Specifically, the processing circuit 50 makes the driving circuit 40 execute the overdrive where a correction amount is set for each of the pixels PIX (an amount of increase in the applied voltage with regard to the liquid crystal element CL) according to a difference in the image data DA which corresponds to the unit period U1 in each of the display periods Pi and the image data DA which corresponds to the last unit period U4 in the immediately previous display period Pi. The overdrive of each of the pixels PIX is not executed in the unit period U2 to the unit period U4 in each of the display periods Pi.

The second action mode is an action mode where the overdrive is executed in the driving circuit 40 in the unit period U1 and the unit period U2 in each of the display period Pi as shown in FIG. 6B. Specifically, the processing circuit 50 makes the driving circuit 40 execute the overdrive with a correction amount in the unit period U1 (that is, the overdrive in the same manner as the first action mode) according to a difference in the image data DA which corresponds to the unit period U1 in each of the display periods Pi and the image data DA which corresponds to the last unit period U4 in the immediately previous display period Pi. In addition, the processing circuit 50 makes the driving circuit 40 execute the overdrive with a correction amount in the unit period U2 according to a difference in the image data DA which corresponds to the unit period U2 in each of the display periods Pi and the image data DA which corresponds to the last unit period U4 in the immediately previous display period. That is, in the second action mode, the image data DA of both the unit period U1 and the unit period U2 are compared with the image data DA of the unit period U4 in the immediately previous display period Pi. The overdrive of each of the pixels PIX is not executed in the unit period U3 and the unit period U4 in each of the display periods Pi.

Figure 6C:
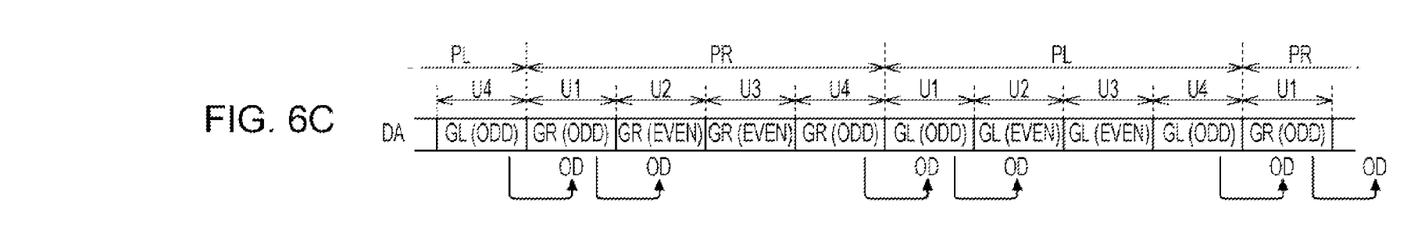

The third action mode is an action mode where the overdrive is executed in the driving circuit 40 in the unit period U1 and the unit period U2 in each of the display period Pi as shown in FIG. 6C. Specifically, other than making the driving circuit 40 execute the overdrive in the same manner as the first action mode where a correction amount is set in the unit period U1 according to a difference in the image data DA which corresponds to the unit period U1 in each of the display periods Pi and the image data DA which corresponds to the last unit period U4 in the immediately previous display period Pi, the processing circuit 50 makes the driving circuit 40 execute the overdrive where a correction amount is set in the unit period U2 according to a difference in the image data DA which corresponds to the unit period U2 in each of the display periods Pi and the image data DA which corresponds to the unit period U1 in the immediately previous display period Pi. In the same manner as the second action mode, the overdrive of each of the pixels PIX is not executed in the unit period U3 and the unit period U4 in each of the display periods Pi. As is understood from the description above, the unit periods U (U1, U2) where the overdrive is executed in each of the display periods Pi is common to the second action mode and the third action mode, but the target of the comparison with the image data DA which corresponds to the unit period U2 is different in the second action mode (the image data DA of the unit period U4 of the immediately previous display period Pi) and the third action mode (the image data DA of the immediately previous unit period U1).

Figure 6D:
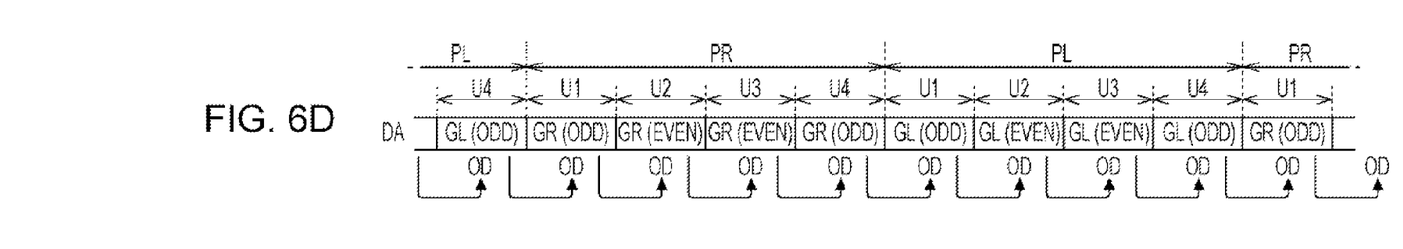

The fourth action mode is an action mode where the overdrive is executed in the driving circuit 40 in each of the four unit periods U1 to U4 in each of the display period Pi as shown in FIG. 6D. Specifically, the processing circuit 50 makes the driving circuit 40 execute the overdrive with a correction amount in each of the unit periods U according to a difference in the image data DA of each of the unit periods U and the image data DA of the immediately previous unit period U. Specifically, the overdrive with a correction amount is executed in the unit period U1 in each of the display periods Pi according to the image data DA of the unit period U1 and the image data DA of the unit period U4 in the immediately previous display period Pi. In addition, the overdrive with a correction amount is executed in the unit period U2 in each of the display periods Pi according to the image data DA of the unit period U2 and the image data DA of the immediately previous unit period U1. In the same manner, the overdrive with a correction amount is executed in the unit period U3 according to a difference in the image data DA of the unit period U2 and the unit period U3, and the overdrive with a correction amount is executed in the unit period U4 according to a difference in the image data DA of the unit period U3 and the unit period U4.

As shown in FIG. 5, the processing circuit 50 is provided with a storage section 52, a writing control section 54, a drive control section 56, and a D/A conversion section 58. The storage section 52 is a memory which stores the image data DA (specific gradation for (M/2) rows vertically by N columns horizontally) which was supplied to the processing circuit 50 in the past in order to compare with the latest image data DA which is supplied to the processing circuit 50. As has been described with reference to FIGS. 6A to 6D, since the image data DA which is compared to the latest image data DA is different according to the action mode, the writing control section 54 controls the writing of the image data DA for comparison according to the action mode.

Specifically, in the first action mode in FIG. 6A and the second action mode in FIG. 6B, the writing control section 54 stores the image data DA of the unit period U4 in each of the display periods Pi in the storage section 52. On the other hand, the image data DA from the unit period U1 to the unit period U3 in each of the display periods Pi are not stored in the storage section 52 in the first action mode and the second action mode. Accordingly, in a period when the image data DA of the unit period U1 and the unit period U2 in each of the display periods Pi are supplied to the processing circuit 50, the image data DA of the unit period U4 in the immediately previous display period Pi is held in the storage section 52.

On the other hand, in the third action mode in FIG. 6C, the writing control section 54 stores the image data DA of the unit period U1 and the unit period U4 in each of the display periods Pi in the storage section 52. Accordingly, at a point in time when the image data DA of the unit period U1 in each of the display periods Pi is supplied to the storage section 52, the image data DA of the unit period U4 in the immediately previous display period Pi is held in the processing circuit 50, and at a point in time when the image data DA of the unit period U2 in each of the display periods Pi is supplied to the processing circuit 50, the image data DA of the immediately previous unit period U1 is held in order in the storage section 52. In addition, in the fourth action mode in FIG. 6D, the writing control section 54 stores the image data DA of each of the unit periods U1 to U4 in each of the display periods Pi in the storage section 52. Accordingly, at a point in time when the image data DA of each of the unit periods U is supplied to the processing circuit 50, the image data DA of the immediately previous unit period U is held in the storage section 52.

The driving control section 56 of the FIG. 5 generates the image data DB which makes the driving circuit 40 execute the overdrive with a correction amount (an amount of increase in the applied voltage with regard to the liquid crystal element CL) according to a difference in the image data DA of the latest processing target which is supplied from an external circuit and the image data DA for comparison which is stored in the storage section 52. Specifically, the driving control section 56 is able to execute a correction process where the image data DA which is a processing target is converted to the image data DB. The correction process is a process where the image data DB is generated by the specific gradation of the image data DA which is the processing target being adjusted for each of the pixels PIX so that the applied voltage with regard to the liquid crystal element CL is increased by only the correction amount according to a difference of each of the specific gradations of the image data DA which is the processing target and each of the specific gradations of the image data DA for comparison in the storage section 52. The correction amount of the overdrive of each of the pixels PIX (an amount of increase in the applied voltage with regard to the liquid crystal element CL) is set for each of the pixels PIX so as to increase as the difference between the specific gradation of the image data DA which is the processing target and the specific gradation of the image data DA for comparison increases (change in the display gradation is larger) and is set to zero (no overdrive) in a case where the specific gradation of both of the image DA match. A look up table where the difference value of the image data DA which is the processing target and the image data DA for comparison corresponds to the specific gradation at the image data DB is appropriately adopted as the driving control section 56.

Since the unit periods U where the overdrive is executed in the driving circuit 40 in each of the display periods Pi are different according to the action mode, the driving control section 56 of FIG. 5 selectively executes the conversion process in the unit periods U according to the action mode out of each of the display periods Pi (that is, the unit periods U which is the target of the overdrive). Specifically, the conversion process is executed in the unit period U1 in each of the display periods Pi in the first action mode in FIG. 6A, the conversion process is executed in the unit period U1 and the unit period U2 in each of the display periods Pi in the second action mode in FIG. 6B and in the third action mode in FIG. 6C, and the conversion process is executed in each of the unit periods U1 to U4 in each of the display periods Pi in the fourth action mode in FIG. 6D. In the unit periods U where the overdrive is not executed out of each of the display periods Pi, the driving control section 56 outputs the image data DA which is the processing target as the image data DB without the conversion processing having been executed.

The D/A conversion section 58 of FIG. 5 converts the image data DB of each of the pixels PIX which are sequentially generated by the driving control section 56 to an analog image signal VID and supplies to the driving circuit 40 (the signal line driving circuit 44). As a result of the processing circuit 50 (the writing control section 54 and the driving control section 56) which are activated as above according to the action mode, the overdrive which corresponds to any of the first action mode to the fourth action mode is executed by the driving circuit 40.

The glasses control circuit 144 of the control circuit 14 of FIG. 1 controls the state (open state or closed state) of each of the right-eye shutter 22 and the left-eye shutter 24 of the stereoscopic glasses 20 by synchronizing with the action of the electro-optical panel 12. Specifically, as shown in FIG. 3, the glasses control circuit 144 maintains both of the right-eye shutter 22 and the left-eye shutter 24 in the closed state in the unit period U1 of each of the display periods P (PR, PL). In addition, the glasses control circuit 144 maintains of the right-eye shutter 22 in the open state and the left-eye shutter 24 in the closed state in the period other than the unit period U1 of the right-eye display period PR (from the starting point of the unit period U2 to the completion point of the unit period U4), and maintains of the left-eye shutter 24 in the open state and the right-eye shutter 22 in the closed state in the period other than the unit period U1 of the left-eye display period PL.

Accordingly, the right-eye image GR which is displayed in the pixel section 30 in the unit period U2 to the unit period U4 in the right-eye display period PR reaches the right eye of the observer by passing through the right-eye shutter 22 and is blocked by the left-eye shutter 24. On the other hand, the left-eye image GL which is displayed in the pixel section 30 in the unit period U2 to the unit period U4 in the left-eye display period PL reaches the left eye of the observer by passing through the left-eye shutter 24 and is blocked by the right-eye shutter 22. By the right-eye image GR which passes through the right-eye shutter 22 being visually recognized by the right eye and the left-eye image GL which passes through the left-eye shutter 24 being visually recognized by the left eye, the observer perceives a stereoscopic effect in the display image.

The left-eye image GL which is displayed in the immediately previous left-eye display period PL (the unit period U4) is sequentially updated to the right-eye image GR every two rows in the unit period U1 in the right-eye display period PR, and the right-eye image GR which is displayed in the immediately previous right-eye display period PR (the unit period U4) is sequentially updated to the left-eye image GL every two rows in the unit period U1 in the left-eye display period PL. That is, the right-eye image GR and the left-eye image GL are in a mixed state in the unit period U1 in each of the display periods P. In the embodiment, since both of the right-eye shutter 22 and the left-eye shutter 24 are maintained in the closed state in the unit period U1 in each of the display periods P, the mixed state (cross talk) of the right-eye image GR and the left-eye image GL is not perceived by the observer. That is, since the right-eye image GR and the left-eye image GL are reliably separated to the right eye and the left eye, it is possible for a clear stereoscopic effect to the perceived by the observer.

In the embodiment described above, the gradation potential X[n] is supplied to each of the pixels PIX by the M lines of the scanning lines 32 being selected two lines at a time in the unit period U1 in each of the display periods Pi. Accordingly, when compared to a configuration where the M lines of the scanning line 32 are selected one line at a time in the unit period U1 in each of the display periods Pi, a length of time of a period (the unit period U1 where both the right-eye shutter 22 and the left-eye shutter 24 are maintained in the closed state in order to prevent cross talk), where the right-eye image GR and the left-eye image GL are in a mixed state, is reduced. That is, the length of time, when it is possible for the right-eye shutter 22 and the left-eye shutter 24 to be maintained in the open state out of the display period Pi, is sufficiently secured. Accordingly, it is possible for the brightness of the display image which is visually recognizes by the observer to be improved.

Here, in a case where the unit period U1 is set to a short time in this manner, in a configuration where the overdrive is executed only in the unit period U1 as in the first action mode, the time where the excess voltage is applied to the liquid crystal element CL is insufficient and there is a possibility that it is difficult for the liquid crystals 66 to sufficiently change to an expected state at the completion point of the unit period U1. It is possible to apply the excess voltage sufficiently to the liquid crystal element CL so that the liquid crystals 66 responds to an expected state by increasing the gradation potential X[n], but the gradation potential X[n] is limited in practice by circumstances such as the performance of the voltage resistance of the driving circuit 40. In the second action mode to the fourth action mode of the embodiment, the overdrive is executed over a plurality of unit periods U in each of the display periods Pi. Accordingly, it is possible to reliably drive the liquid crystals 66 of the liquid crystal element CL with the overdrive over the plurality of unit periods U even in a case where the excess voltage is suppressed in each of the unit periods U. That is, compared to a configuration where the overdrive is executed in only the unit period U1, it is possible to make the crosstalk difficult to be perceived while reducing the excess voltage due to the overdrive. The result of the above is exceptionally remarkable in the fourth action mode where the overdrive is executed for each of the unit periods U.

Here, the image data DA which is to be compared with the image data DA which is the processing target by the driving control section 56 may differ in order to set the correction amount of the overdrive according to the content of the display image and the like. That is, there are cases where the second action mode, where the image data DA of the unit period U2 in each of the display periods Pi is compared to the image data DA of the unit period U4 in the immediately previous display periods Pi, is appropriate, there are also cases where the third action mode, where the image data DA of the unit period U2 in each of the display periods Pi is compared to the image data DA of the immediately previous unit period U1, is appropriate. In the embodiment, since any of the plurality of action modes where the image data DA which is the processing target and the image data DA for comparison are different (the second action mode and the third action mode) is selected, there is an advantage in that it is possible to realize appropriate overdrive according to the content of the display image.

Modification Example

The aspects above may be modified in various ways. Specific modified aspects are exemplified below. Two or more of the aspects which are arbitrarily selected from the following exemplifications may be suitably combined in a range which is not mutually contradictory.

(1) In the aspects described above, the configuration where the plurality of action modes are able to be selected is exemplified, but it is possible for the processing circuit 50 to be activated in a fixed manner in any of the respective action modes described above. For example, configurations where the processing circuit 50 is activated only in the second action mode or is activated only in the third action mode may be adopted.

(2) In the aspects described above, the gradation potential X[n] is supplied to each of the pixels PIX in the first group in the unit period U1 according to the specific gradation Gi[2k−1] in the odd rows and the gradation potential X[n] is supplied to each of the pixels PIX in the even rows in the unit period U2 according to the specific gradation Gi[2k] in the even rows, and the gradation potential X[n] is supplied to each of the pixels PIX in the second group in the unit period U3 according to the specific gradation Gi[2k] in the even rows and the gradation potential X[n] is supplied to each of the pixels PIX in the odd rows in the unit period U4 according to the specific gradation Gi[2k−1] in the odd rows, the odd rows and the even rows of the pixels PIX which are selected in the unit period U2 and the unit period U4 and the odd rows and the even rows of the specific gradation which is reflected by the gradation potential X[n] in each of the unit periods U are not limited to the exemplifications above.

For example, it is possible that the gradation potential X[n] is supplied to each of the pixels PIX in the first group in the unit period U1 according to the specific gradation Gi[2k] in the even rows and the gradation potential X[n] is supplied to each of the pixels PIX in the odd rows in the unit period U2 according to the specific gradation Gi[2k−1] in the odd rows, and the gradation potential X[n] is supplied to each of the pixels PIX in the second group in the unit period U3 according to the specific gradation Gi[2k−1] in the odd rows and the gradation potential X[n] is supplied to each of the pixels PIX in the even rows in the unit period U4 according to the specific gradation Gi[2k] in the even rows. In addition, in the aspects described above, the $(2k-1)^{th}$ row and the $2k^{th}$ row are set as the first group and the $2k^{th}$ row and the $(2k+1)^{th}$ row are set as the second group, but the method of segmentation of the M lines of the scanning lines 32 may be appropriately changed. For example, a configuration may be adopted where the $2k^{th}$ row and the $(2k+1)^{th}$ row are set as the first group and the $(2k-1)^{th}$ row and the $2k^{th}$ row are set as the second group.

(3) A method where each of the pixels PIX are driven in each of the display periods Pi is not limited to the exemplifications above. For example, in the aspects described above, each of the display periods Pi are segmented into the four unit periods U1 to U4, but the number of the unit periods U in the display period Pi is arbitrary. For example, a configuration where each of the display periods P are segmented into two unit periods U (U1 and U2) may also be adopted. In each of the unit period U1 and the unit period U2, for example, each of the pixels PIX are driven using the same method as the first embodiment. As is understood from the exemplifications above, the driving circuit 40 according to the appropriate aspects of the invention is comprehended as a factor which supplies the gradation potential X[n] by selecting each of the pixels PIX for each of the plurality of rows in the initial unit period U1 in each of the display periods Pi.

(4) The number of the unit periods U where the overdrive is executed by the driving circuit 40 in each of the display periods Pi in the second action mode and the third action mode may be appropriately changed. For example, in the configuration described above where each of the display periods Pi includes the four unit periods U1 to U4, it is possible for the overdrive to be executed by the driving circuit 40 in each of the unit period U1 to the unit period U3 in each of the display periods Pi.

(5) In the aspects described above, the right-eye shutter 22 is changed from the closed state to the open state at the completion point of the unit period U1 of the right-eye display period PR, but the timing when the right-eye shutter 22 is changed from the closed state to the open state may be appropriately changed. For example, in a configuration where the right-eye shutter 22 is changed to the open state before the completion point of the unit period U1 of the right-eye display period PR, cross talk in the unit period U1 is slightly perceived by the observer, but the brightness of the display image is improved. On the other hand, in a configuration where the right-eye shutter 22 is changed to the open state after the completion point of the unit period U1 of the right-eye display period PR, the brightness of the display image is lowered but it is possible to effectively prevent cross talk being perceived by the observer. In the same manner, a configuration may be adopted where the period when the right-eye shutter 22 is changed from the open state to the closed state is set before or after the completion point of the unit period U4 of the right-eye display period PR. Here, the timing of the opening and closing where cross talk is difficult to be perceived by the observer depends on the relationship between the response characteristics of the right-eye shutter 22 and the left-eye shutter 24 and the response characteristics of the electro-optical panel 12 (the liquid crystal element CL). Accordingly, the timing of the opening and the closing of the right-eye shutter 22 is selected in consideration of various factors such as the prioritization of the preventing of cross talk and the securing of the brightness of the display image and the relationship of the response characteristics of the stereoscopic glasses 20 and the response characteristics of the electro-optical panel 12. Here, the right-eye shutter 22 is mentioned in the description above but the timing of the opening and closing of the left-eye shutter 24 is the same.

As is understood from the description above, the period where the right-eye shutter 22 is maintained in the open state is comprehended as the period (irrespective of whether or not a portion of the end of the immediately previous unit period U1 is included) which includes at least a portion of the period other than the unit period U1 out of the right-eye display period PR (from the unit period U2 to the unit period U4). In the same manner, the period where the left-eye shutter 24 is maintained in the open state is comprehended as the period (irrespective of whether or not a portion of the end of the immediately previous unit period U1 is included) which includes at least a portion of the period other than the unit period U1 of the left-eye display period PL. In addition, the period where both the right-eye shutter 22 and the left-eye shutter 24 are controlled to be in the close state is comprehended as the period (irrespective of whether or not a portion of the front of the immediately following unit period U2 is included) which includes at least a portion of the unit period U1 out of each of the display periods P (PR, PL).

(6) The number of the scanning lines 32 which are simultaneously selected in the unit period U1 and the unit period U3 is arbitrary. That is, the action of the scanning line driving circuit 42 in the unit period U1 and the unit period U3 is comprehended as the action where the scanning lines 32 are sequentially selected by Q rows (Q is a natural number of two or more) at a time.

(7) The electro-optical element (display element) is not limited to the liquid crystal element CL. For example, it is possible for an electrophoretic element to be used as the electro-optical element. That is, the electro-optical element is comprehended as the display element where the optical characteristics (for example, the transparency) changes according to an electrical action (for example, the application of a voltage).

Application Example

The electro-optical device 10 which is exemplified in each of the aspects above may be used in various types of electronic apparatuses. Specific aspects of the electronic apparatuses which adopt the electro-optical device 10 are exemplified in FIGS. 7 to 9.

Figure 7:
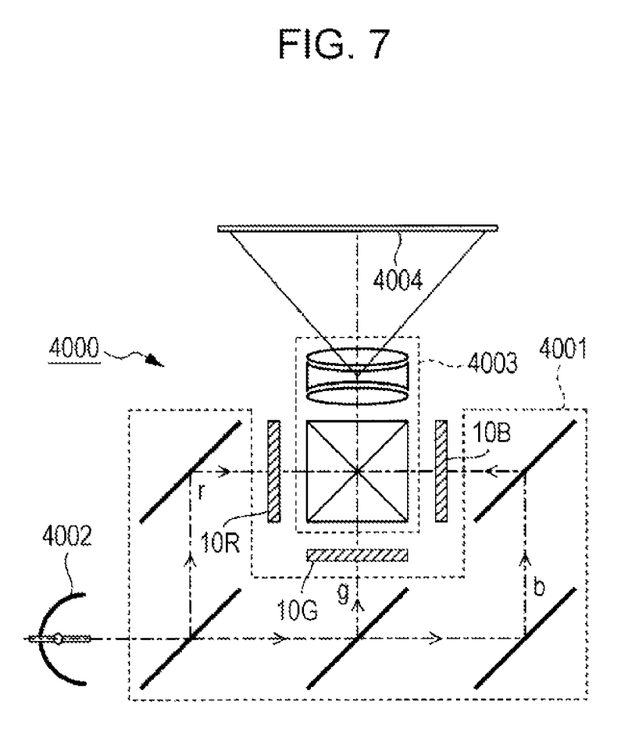
FIG. 7 is a perspective view of an electronic apparatus (a projector display device).

FIG. 7 is a perspective view of a projector display device (three plate type projector) 4000 which adopts the electro-optical device 10. The projector display device 4000 is configured to include three of the electro-optical devices 10 (10R, 10G, and 10B) which correspond to different display colors (red, green, and blue). Out of outgoing light from an illumination device (light source) 4002, an illumination optical system 4001 supplies a red component r to the electro-optical device 10R, supplies a green component g to the electro-optical device 10G, and supplies a blue component b to the electro-optical device 10B. Each of the electro-optical devices 10 functions as an optical modulator (light valve) which modulates each color of light which is supplied from the illumination optical system 4001 according to the display image. A projection optical system 4003 combines the outgoing light from each of the electro-optical devices 10 and projects to a projection screen 4004. The observer visually recognizes a stereoscopic image which is projected onto the projection screen 4004 using the stereoscopic glasses 20 (which are omitted from the diagram in FIG. 7).

Figure 8:
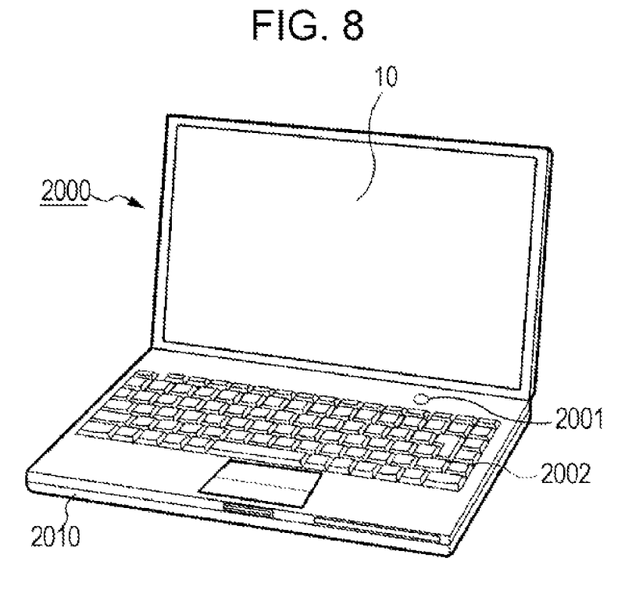
FIG. 8 is a perspective view of an electronic apparatus (a personal computer).

FIG. 8 is a perspective view of a portable personal computer which adopts the electro-optical device 10. A personal computer 2000 is provided with the electro-optical device 10 which display various types of images and a main body 2010 where a power switch 2001 and a keyboard 2002 are disposed.

Figure 9:
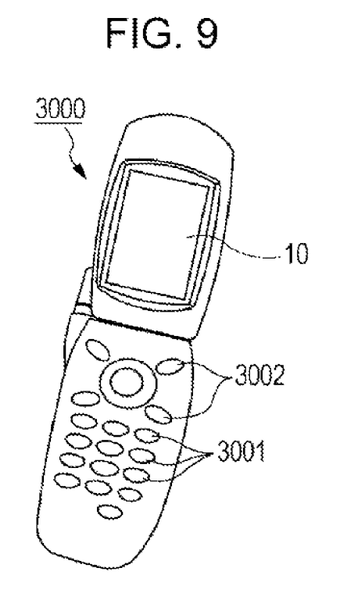
FIG. 9 is a perspective view of an electronic apparatus (a mobile phone).

FIG. 9 is a perspective view of a mobile phone which adopts the electro-optical device 10. A mobile phone 3000 is provided with a plurality of operation buttons 3001, a scroll button 3002, and the electro-optical device 10 which displays various types of images. By operating the scroll button 3002, the screen which is displayed in the electro-optical device 10 is scrolled.

Here, as the electronic apparatus where the electro-optical device according to the invention is applied, examples other than the apparatuses which are exemplified in FIGS. 7 to 9 include an apparatus which is provided with a personal digital assistant (PDA), a digital still camera, a television, a video camera, a car navigation device, a display unit for a vehicle (instrument panel), an electronic notebook, electronic paper, a calculator, a word processor, a work station, a TV phone, a POS terminal, a printer, a scanner, a copier, a video player, a touch panel, or the like.

What is claimed is:
1. An electro-optical device which displays a right-eye image in a right-eye image display period and a left-eye image in a left-eye image display period after the right-eye image display period, the electro-optical device comprising:
   a pixel which is positioned in a pixel section;
   a driving unit which supplies to the pixel an image signal corresponding to image data in the right-eye image display period and the left-eye image display period; and
   a driving control unit which controls the driving unit to execute overdrive of the image signal and non-overdrive of the image signal in the first right-eye image display period and the left-eye image display period, wherein
   the right-eye image display period and the left-eye image display period include a plurality of unit periods, the driving unit executes the overdrive in each first unit period of the plurality of unit periods in the right-eye image display period and the left-eye image display period, the driving unit does not execute overdrive in a second unit period of the right-eye image display period following the first unit period of the right-eye image display period and does not execute overdrive in a second unit period of the left-eye image display period following the first unit period of the left-eye image display period, and the right-eye image is updated from the left-eye image in the first unit period in the right-eye image display period and the right-eye image is not updated from the left-eye image in the second unit period in the right-eye image display period, and the left-eye image is updated from the right-eye image in the first unit period in the left-eye image display period and the left-eye image is not updated from the right-eye image in the second unit period in the left-eye image display period.

2. An electronic apparatus comprising:
electro-optical device according to claim 1.

3. The electro-optical device according to claim 1, wherein the image signal includes:
a first potential which is supplied to the pixel when the driving control unit executes the overdrive; and
a second potential which is supplied to the pixel when the driving control unit executes the non-overdrive, and
wherein the first potential is larger than the second potential.

4. The electro-optical device according to claim 1, wherein the first unit period is longer than the second unit period in each of the right-eye image display period and the left-eye image display period.

5. The electro-optical device according to claim 1, wherein the second unit period is longer than the first unit period in each of the right-eye image display period and the left-eye image display period.

6. The electro-optical device according to claim 1, wherein the first unit period is longer than the second unit period, and a third unit period is longer than a fourth unit period, in each of the right-eye image display period and the left-eye image display period.

7. The electro-optical device according to claim 1, wherein the second unit period is longer than the first unit period and a fourth unit period is longer than a third unit-period in each of the right-eye image display period and the left-eye image display period.

8. The electro-optical device according to claim 1, wherein
a fourth unit period is after a third unit period.

9. The electro-optical device according to claim 1, wherein
the driving unit supplies an image signal for pixels in a first scanning line to both the first scanning line and a second scanning line adjacent to the first scanning line, during the first unit period of the plurality of unit periods in each of the right-eye image display period and the left-eye image display period,
the driving unit supplies an image signal for pixels in the second scanning line to the second scanning line during the second unit period of the plurality of unit periods in each of the right-eye image display period and the left-eye image display period,
the driving unit supplies an image signal for pixels in the second scanning line to both the second scanning line and a third scanning line adjacent to the second scanning line, during a third unit period of the plurality of unit periods in each of the right-eye image display period and the left-eye image display period, and
the driving unit supplies an image signal for pixels in the first scanning line to the first scanning line and supplies an image signal for pixels in the third scanning to the third scanning line during a fourth unit period of the plurality of unit periods in each of the right-eye image display period and the left-eye image display period.

10. The electro-optical device according to claim 1, wherein each of the plurality of unit periods in the right-eye image display period and the left-eye image display period are an equal length of time.

11. The electro-optical device according to claim 1, further comprising:
a first group including a plurality of scanning lines; and
a second group including a plurality of scanning lines; wherein
each scanning line in the second group is positioned between scanning lines in the first group,
the driving unit supplies image signals for pixels in the first group to both the first group and the second group during a first unit period of the plurality of unit periods,
the driving unit supplies image signals for pixels in the second group to both the second group and the first group during a third unit period of the plurality of unit periods,
the driving unit supplies image signals for pixels in the second group to only the second group during a second unit period that is between the first unit period and the third unit period, and
the driving unit supplies image signals for pixels in the first group to only the first group during a fourth unit period that is after the third unit period.

12. The electro-optical device according to claim 1, further comprising:
a glasses control circuit which controls open state or closed state of each of a right-eye shutter blocking the left-eye image and a left-eye shutter blocking the right-eye image,
wherein the glasses control circuit maintains both of the right-eye shutter and the left-eye shutter in the closed state in each first unit period.

13. The electro-optical device according to claim 1, wherein the driving unit does not execute overdrive in at least two three unit periods of the right-eye image display period following the first unit period of the right-eye image display period and does not execute overdrive in at least three unit periods of the left-eye image display period following the first unit period of the left-eye image display period.

14. An electro-optical device which displays a right-eye image in a right-eye image display period and a left-eye image in a left-eye image display period, the electro-optical device comprising:
a pixel which is positioned in a pixel section;
a driving unit which supplies to the pixel a first overdrive image signal and a first non-overdrive image signal in the right-eye image display period, and which supplies to the pixel a second overdrive image signal and a second non-overdrive image signal in the left-eye image display period; and a driving control unit which controls the driving unit to execute first overdrive for the first overdrive image signal and first non-overdrive for the first non-overdrive image signal in the right-eye image display period, and which controls the driving unit to execute second overdrive for the second overdrive image signal and second non-overdrive for the second non-overdrive image signal in the left-eye image display period, wherein
- the right-eye image display period and the left-eye image display period include a plurality of unit periods,
- the driving unit executes the first overdrive in a first unit period of the plurality of unit periods in the right-eye image display period and the second overdrive in a first unit period of the plurality of unit periods in the left-eye image display period, and
- the driving unit executes the first non-overdrive in a second unit period of the right-eye image display period following the first unit period of the right-eye image display period and executes the second non-overdrive in a second unit period of the left-eye image display period following the first unit period of the left-eye image display period, and
- the right-eye image is updated from the left-eye image in the first unit period in the right-eye image display period and the right-eye image is not updated from the left-eye image in the second unit period in the right-eye image display period, and
- the left-eye image is updated from the right-eye image in the first unit period in the left-eye image display period and the left-eye image is not updated from the right-eye image in the second unit period in the left-eye image display period.

15. The electro-optical device according to claim 14, wherein a fourth unit period is after a third unit period.

* * * * *